US012634576B2

(12) United States Patent　　(10) Patent No.:　US 12,634,576 B2
Igarashi　　(45) Date of Patent:　May 19, 2026

(54) ELECTRONIC DEVICE AND CONTROL METHOD OF ELECTRONIC DEVICE FOR PLACING A CAPTURING-TARGET OBJECT WITHIN A RANGE APPROPRIATE FOR EDITING

(71) Applicant: CANON KABUSHIKI KAISHA, Tokyo (JP)

(72) Inventor: Yuka Igarashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 180 days.

(21) Appl. No.: 18/425,440

(22) Filed: Jan. 29, 2024

(65) Prior Publication Data

US 2024/0267616 A1　Aug. 8, 2024

(30) Foreign Application Priority Data

Feb. 3, 2023　(JP) ................................. 2023-015449

(51) Int. Cl.
　*H04N 23/60*　(2023.01)
　*H04N 23/611*　(2023.01)
　*H04N 23/63*　(2023.01)
　*H04N 23/67*　(2023.01)
(52) U.S. Cl.
　CPC ........... *H04N 23/64* (2023.01); *H04N 23/611* (2023.01); *H04N 23/632* (2023.01); *H04N 23/635* (2023.01); *H04N 23/675* (2023.01)
(58) Field of Classification Search
　CPC .... H04N 23/64; H04N 23/611; H04N 23/632; H04N 23/635; H04N 23/675; H04N 23/62

USPC ...................................................... 348/333.03
See application file for complete search history.

(56) References Cited

U.S. PATENT DOCUMENTS

| | | | |
|---|---|---|---|
| 10,917,648 B2 * | 2/2021 | Yonezawa | H04N 19/33 |
| 2004/0189829 A1 * | 9/2004 | Fukuda | H04N 23/634 |
| | | | 348/E5.042 |
| 2010/0149400 A1 * | 6/2010 | Sugino | H04N 23/73 |
| | | | 348/E5.022 |
| 2011/0058787 A1 * | 3/2011 | Hamada | H04N 21/4334 |
| | | | 386/E5.069 |
| 2013/0038759 A1 * | 2/2013 | Jo | H04N 23/634 |
| | | | 348/240.99 |

(Continued)

FOREIGN PATENT DOCUMENTS

| | | |
|---|---|---|
| JP | 2010152135 A | 7/2010 |
| JP | 2018125729 A | 8/2018 |

*Primary Examiner* — Usman A Khan
(74) *Attorney, Agent, or Firm* — Canon U.S.A., Inc. IP Division

(57)　　ABSTRACT

An electronic device includes at least one memory and at least one processor which function as: an acquisition unit configured to acquire a live-view image; a setting unit configured to set an editing target region in accordance with a user operation; a determination unit configured to determine a capturing-target object region on a basis of the live-view image; and a display control unit configured to perform control so as to display the live-view image, wherein the display control unit performs control so as to display the live-view image such that the editing target region is identifiable, on a basis of whether or not a first condition regarding overlap between the editing target region and the capturing-target object region is satisfied.

26 Claims, 10 Drawing Sheets

(56) References Cited

U.S. PATENT DOCUMENTS

| | | | |
|---|---|---|---|
| 2013/0202154 A1* | 8/2013 | Hirano | H04N 13/211 |
| | | | 382/103 |
| 2013/0258117 A1* | 10/2013 | Penov | G06V 10/24 |
| | | | 348/207.1 |
| 2014/0152875 A1* | 6/2014 | Tobin | H04N 23/62 |
| | | | 348/239 |
| 2018/0176474 A1* | 6/2018 | Blanco | G06T 11/60 |
| 2020/0213508 A1* | 7/2020 | Agarwal | H04N 23/80 |
| 2022/0279132 A1* | 9/2022 | Watanabe | H04N 23/675 |

* cited by examiner

*FIG. 4*

FIG. 8A     800
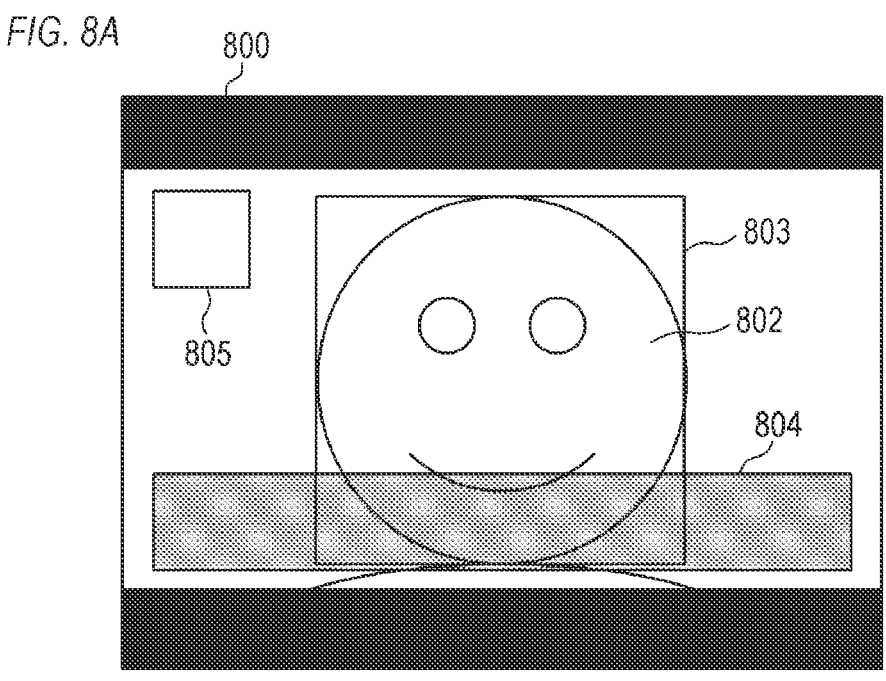
FIG. 8B     800
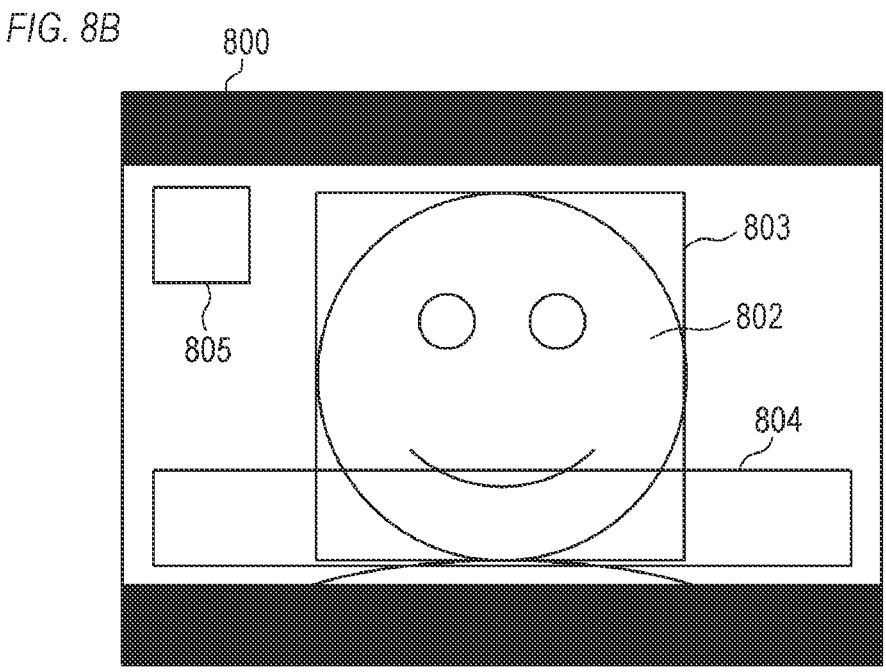

ELECTRONIC DEVICE AND CONTROL METHOD OF ELECTRONIC DEVICE FOR PLACING A CAPTURING-TARGET OBJECT WITHIN A RANGE APPROPRIATE FOR EDITING

BACKGROUND

Technical Field

The present disclosure relates to an electronic device, a control method of an electronic device, and a non-transitory computer readable medium, and more particularly to live-view display.

Description of the Related Art

There is an increasing number of users each of whom edits a moving image captured by themself and contributes the edited moving image to a social networking service (SNS). It is difficult for a photographer to place an object to be photographed within the angle of view (photographing range) as intended when photographing the object while moving (e.g. while walking). In the case of self-photographing, it is very difficult for the photographer to place both his or her own face and a building or a scenery desired to be photographed within the angle of view as intended.

Japanese Patent Application Laid-open No. 2018-125729 discloses a technology for setting a boundary between the inside and outside of a range to be photographed and giving a notification when the photographing range approaches the boundary. Japanese Patent Application Laid-open No. 2010-152135 discloses a technology in which a range displayed on all of a plurality of screens with different aspect ratios in a photographing range is set as a safe area, and a warning is issued if it is determined that there is a possibility that an AF frame will move to the outside of the safe area.

When a captured image is edited, a partial region of the captured image may be edited. For example, a telop is combined with a partial region of the captured image, or a graphic indicating a contributor or a channel is combined with a partial region of the captured image. In such editing, the position and size of the graphic (including the telop) are determined (adjusted) so as not to interfere with a capturing-target object desired to be viewed by viewers.

However, if the position and size of the capturing-target object in the captured image are not stable (i.e. frequently change), the position and size of the graphic need to be adjusted. Depending on the position and size of the capturing-target object, the graphic cannot be combined (i.e. interferes with the capturing-target object), and a retake of photographing is required. Similar problems (i.e. an increase in time and effort required) may also arise in editing other than combining of graphics. Even with the technologies disclosed in Japanese Patent Application Laid-open No. 2018-125729 and Japanese Patent Application Laid-open No. 2010-152135, a capturing-target object cannot be easily placed at a position appropriate for editing, and the time and effort for editing may increase.

SUMMARY

The present disclosure provides a technique to make it easy to place a capturing-target object within a range appropriate for editing.

An electronic device according to the present disclosure includes at least one memory and at least one processor which function as: an acquisition unit configured to acquire a live-view image; a setting unit configured to set an editing target region in accordance with a user operation; a determination unit configured to determine a capturing-target object region on a basis of the live-view image; and a display control unit configured to perform control so as to display the live-view image, wherein the display control unit performs control so as to display the live-view image such that the editing target region is identifiable, on a basis of whether or not a first condition regarding overlap between the editing target region and the capturing-target object region is satisfied.

Further features of the present disclosure will become apparent from the following description of exemplary embodiments with reference to the attached drawings.

BRIEF DESCRIPTION OF THE DRAWINGS

FIG. 4 is a flowchart of angle-of-view assistance processing.

FIGS. 8A and 8B are schematic views of the live-view screen.

DESCRIPTION OF THE EMBODIMENTS

First Embodiment

Figure 1A:
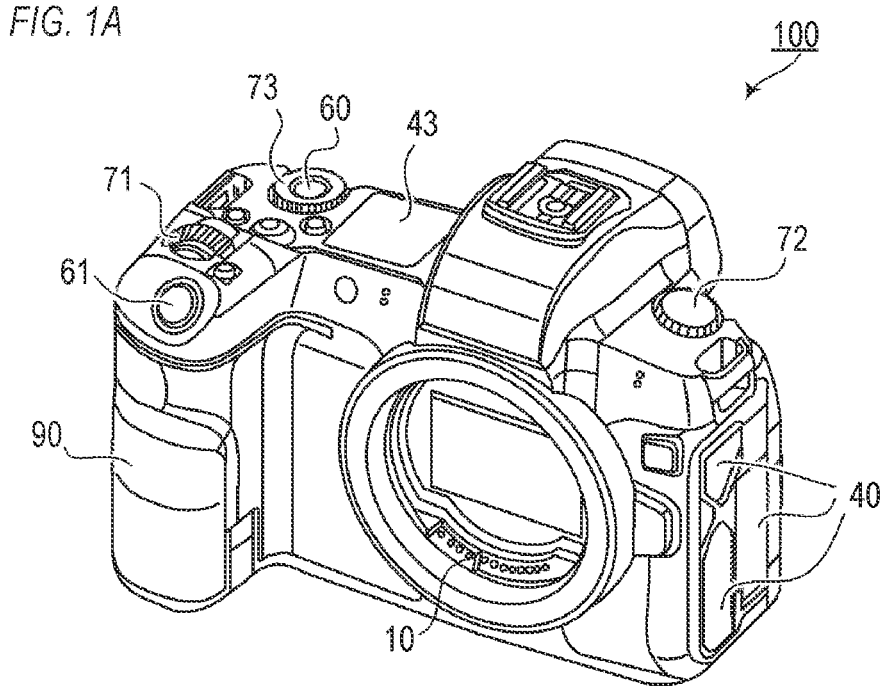
FIGS. 1A and 1B show external appearances of a digital camera.
Figure 1B:
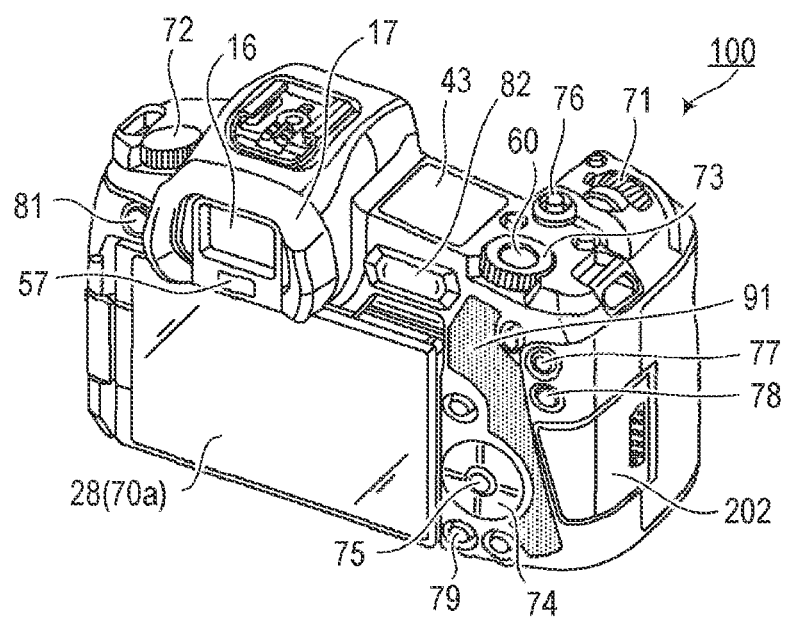

The first embodiment of the present disclosure is described below with reference to the drawings. FIGS. 1A and 1B show external appearances of a digital camera 100 (image capture device) serving as an example of a device (electronic device) to which the present disclosure is applicable. FIG. 1A is a front perspective view of the digital camera 100, and FIG. 1B is a rear perspective view of the digital camera 100.

A display unit 28 is provided in a back face of the digital camera 100, and displays images and various types of information. A connecting section between the digital camera 100 and the display unit 28 has a variable-angle mechanism, and a display surface of the display unit 28 can be oriented in various directions. A touch-screen panel 70a can detect touch operations made to the display surface (touch-operation surface) of the display unit 28. An outside-finder display unit 43 is a display unit provided in an upper face of the digital camera 100, and displays various set values of the digital camera 100 including a shutter speed and an F-number. A shutter button 61 is an operation member for giving a photographing instruction. A mode change-over switch 60 is an operation member for switching between various modes. Terminal covers 40 are covers for protecting connectors (not shown) for connection cables or the like for connecting the digital camera 100 to external devices.

A main electronic dial 71 is a rotary operation member, and set values such as a shutter speed and an f-number can be changed, for example, by rotating the main electronic dial 71. A power switch 72 is an operation member for powering on and off the digital camera 100. A sub-electronic dial 73 is a rotary operation member, and it is possible to move a selection frame (cursor) and feed images forward, for example, by rotating the sub-electronic dial 73. A four-direction key 74 can be pressed in upper, lower, left and right portions thereof, and processing corresponding to a pressed portion of the four-direction key 74 can be performed. A SET button 75 is a push button and is mainly used to determine a selection item or the like.

A moving-image button 76 is used to give instructions to start and stop photographing (recording) a moving image. An AE lock button 77 is a push button, and an exposure state can be fixed by pressing the AE lock button 77 in a photographing standby state. An enlargement button 78 is an operation button for switching on and off of an enlargement mode in live-view display (LV display) in a photographing mode. A live-view image (LV image) can be enlarged and reduced by turning on the enlargement mode and then operating the main electronic dial 71. In a reproduction mode, the enlargement button 78 functions as an operation button for enlarging a reproduced image or increasing the enlargement ratio thereof. A reproduction button 79 is an operation button for switching between the photographing mode and the reproduction mode. The mode is shifted to the reproduction mode by pressing the reproduction button 79 during the photographing mode, and the latest image among images recorded in a later-described recording medium 200 can be displayed on the display unit 28. A menu button 81 is a push button used to perform an instruction operation for displaying a menu screen, and a menu screen that enables various settings is displayed on the display unit 28 by pressing the menu button 81. A user can intuitively make various settings by using the menu screen displayed on the display unit 28, as well as the four-direction key 74 and the SET button 75. The user can change (customize) a function assigned to each of the operation members (buttons, rotary operation members etc.) by changing the settings in the menu screen.

A touch bar 82 is a linear touch sensor (line touch sensor) capable of accepting a touch operation. The touch bar 82 is disposed at a position where a touch operation can be performed with the thumb of the right hand in a state where a grip portion 90 is gripped with the right hand (little finger, third finger, and middle finger of) such that the shutter button 61 can be pressed with the forefinger of the right hand. That is, the touch bar 82 is disposed at a position where the touch bar 82 can be operated in a state (photographing posture) in which the user looks into an eyepiece viewfinder 17 with his or her own eye close to an eyepiece portion 16 so as to be able to press the shutter button 61 at any time. The touch bar 82 is an accepting unit capable of accepting operations such as a tap operation made to the touch bar 82 (an operation to touch the touch bar 82 and separate the finger without moving the touch position within a predetermined period) and a leftward or rightward slide operation (an operation to touch the touch bar 82 and then move the touch position while keeping the touching state). The touch bar 82 is an operation member different from the touch-screen panel 70a and does not have a display function. The touch bar 82 functions, for example, as a multi-function bar (M-Fn bar) to which various functions can be assigned.

A communication terminal 10 is a communication terminal for the digital camera 100 to communicate with a removable lens unit 150, which will be described later. The eyepiece portion 16 is an eyepiece portion of the eyepiece viewfinder 17 (look-in finder), and the user can visually check an image displayed on a later-described internal EVF (electronic view finder) 29 through the eyepiece portion 16. An eye-proximity detection unit 57 is an eye-proximity detection sensor that detects whether or not the user (photographer)'s eye is close to the eyepiece portion 16. A lid 202 is a lid for a slot for accommodating a later-described recording medium 200. The grip portion 90 is a hold portion having a shape that can be easily gripped with the right hand when the user holds the digital camera 100. The shutter button 61 and the main electronic dial 71 are disposed at positions where the shutter button 61 and the main electronic dial 71 can be operated with the forefinger of the right hand in a state where the grip portion 90 is gripped with the little finger, third finger, and middle finger of the right hand to hold the digital camera 100. The sub-electronic dial 73 and the touch bar 82 are also arranged at positions where the sub-electronic dial 73 and the touch bar 82 can be operated by the thumb of the right hand in the same state. A thumb-rest portion 91 (thumb standby position) is a grip portion provided in an area where the thumb of the right hand gripping the grip portion 90 can be easily placed while not operating any operation member on the back side of the digital camera 100. The thumb-rest portion 91 is constituted by a rubber member or the like for enhancing the holding force (grip feeling).

Figure 2:
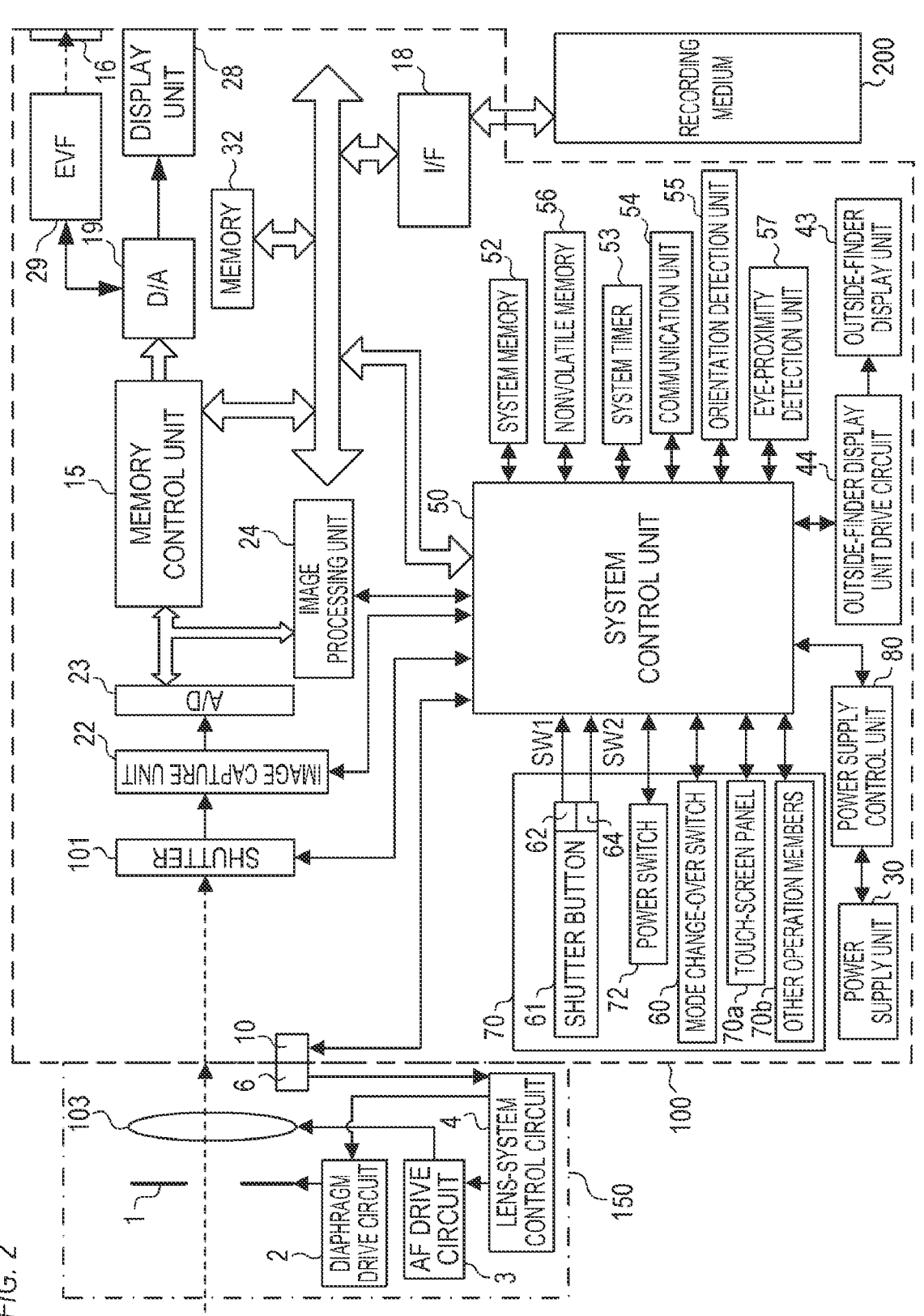
FIG. 2 is a block diagram of the digital camera.

FIG. 2 is a block diagram showing a configuration of the digital camera 100. A lens unit 150 is a lens unit for mounting an interchangeable photographic lens. Usually, a plurality of lenses 103 are provided, but FIG. 2 shows only one lens 103 for simplification. A communication terminal 6 is a communication terminal for the lens unit 150 to communicate with the digital camera 100, and a communication terminal 10 is a communication terminal for the digital camera 100 to communicate with the lens unit 150. The lens unit 150 communicates with a system control unit 50 via these communication terminals 6 and 10. The lens unit 150 controls a diaphragm 1 by an internal lens-system control circuit 4 via a diaphragm drive circuit 2. The lens unit 150 is focused by the lens system control circuit 4 displacing the lens 103 via an AF drive circuit 3.

A shutter 101 is a focal-plane shutter capable of freely controlling the exposure time of an image capture unit 22 under the control of the system control unit 50.

The image capture unit 22 is an image sensor constituted by a CCD or CMOS sensor or the like that converts an optical image to an electrical signal. The image capture unit 22 may have an image-plane phase-difference sensor that outputs defocus-amount information to the system control unit 50. An A/D converter 23 converts an analog signal output from the image capture unit 22 to a digital signal.

An image processing unit 24 performs predetermined processing (pixel interpolation, resizing processing such as reduction, color conversion processing etc.) on data from the A/D converter 23 or data from a memory control unit 15. The image processing unit 24 also performs predetermined arithmetic processing using captured image data, and the system control unit 50 controls exposure and distance measurement based on the arithmetic results obtained by the image processing unit 24. This enables TTL (through-the-lens) AF (autofocus) processing, AE (automatic exposure) processing, EF (pre-flashing) processing, and the like. The image processing unit 24 also performs predetermined arithmetic processing using captured image data and performs TTL AWB (auto white balance) processing based on the obtained arithmetic results.

The memory control unit 15 controls transmission and reception of data between the A/D converter 23, the image processing unit 24, and a memory 32. Output data from the A/D converter 23 is written to the memory 32 via the image processing unit 24 and the memory control unit 15. Alternatively, output data from the A/D converter 23 is written to the memory 32 via the memory control unit 15, not via the image processing unit 24. The memory 32 stores image data obtained by the image capture unit 22 and converted to digital data by the A/D converter 23, and image data to be displayed on the display unit 28 and the EVF 29. The memory 32 has a storage capacity sufficient to store a predetermined number of still images, as well as moving images and sounds for a predetermined time.

The memory 32 also serves as a memory (video memory) for displaying an image. A D/A converter 19 converts image data for display stored in the memory 32 to an analog signal and supplies the analog signal to the display unit 28 and the EVF 29. Thus, the image data for display written to the memory 32 is displayed by the display unit 28 and the EVF 29 via the D/A converter 19. The display unit 28 and the EVF 29 are displays such as LCDs or organic EL displays, and perform display in accordance with an analog signal from the D/A converter 19. A digital signal that has been A/D converted by the A/D converter 23 and stored in the memory 32 is converted to an analog signal by the D/A converter 19, and is sequentially transferred to the display unit 28 or the EVF 29, thereby enabling live-view display (LV). Hereinafter, an image displayed in as live-view display is referred to as a live-view image (LV image).

The system control unit 50 is a control unit constituted by at least one processor and/or at least one circuit, and controls the entire digital camera 100. The system control unit 50 realizes later-described processing by executing programs recorded in a nonvolatile memory 56. The system control unit 50 also controls display by controlling the memory 32, the D/A converter 19, the display unit 28, the EVF 29, and so on.

A system memory 52 is, for example, a RAM, and the system control unit 50 loads constants and variables for operating the system control unit 50, programs read from the nonvolatile memory 56, and the like, to the system memory 52.

The nonvolatile memory 56 is an electrically erasable and recordable memory, and is, for example, an EEPROM or the like. The constants, programs, or the like for operating the system control unit 50 are recorded in the nonvolatile memory 56. The programs here refer to programs for executing various flowcharts, which will be described later.

A system timer 53 is a timer unit for measuring the time used for various controls and the time of a built-in clock.

The communication unit 54 transmits and receives video signals and audio signals to and from external devices connected wirelessly or by cables. The communication unit 54 can also be connected to a wireless LAN (local area network) and the Internet. The communication unit 54 can also communicate with an external device by Bluetooth (registered trademark) or Bluetooth Low Energy. The communication unit 54 can transmit images captured by the image capture unit 22 (including LV images) and images recorded in the recording medium 200, and can receive image data and other various types of information from external devices.

An orientation detection unit 55 detects the orientation of the digital camera 100 relative to the gravity direction. Based on the orientation detected by the orientation detection unit 55, it is possible to determine whether an image captured by the image capture unit 22 is an image captured with the digital camera 100 held horizontally or an image captured with the digital camera 100 held vertically. The system control unit 50 can add direction information corresponding to the orientation detected by the orientation detection unit 55 to an image file of the image captured by the image capture unit 22, and rotate the image and record the rotated image. The orientation detection unit 55 may be an acceleration sensor, a gyro sensor or the like. It is also possible to detect movement of the digital camera 100 (panning, tilting, lifting, whether it is stationary, etc.) using the acceleration sensor or the gyro sensor serving as the orientation detection unit 55.

The eye-proximity detection unit 57 is an eye-proximity detection (approach detection) sensor that detects approach (eye proximity) and departure (eye departure) of the eye (an object) relative to the eyepiece portion 16 of the eyepiece viewfinder 17 (hereinafter referred to simply as "finder"). The system control unit 50 switches on (displaying state) and off (non-displaying state) the display unit 28 and the EVF 29 in accordance with a state detected by the eye-proximity detection unit 57. More specifically, at least in the photographing standby state and when a display-destination switching setting is automatic switching, the display unit 28 is set as the display destination and turned on, i.e. in the displaying state, and the EVF29 is in the non-display state. When the eye is close, the EVF29 is turned on and in the displaying state, while the display unit 28 is in the non-displaying state. The eye-proximity detection unit 57 may be, for example, an infrared proximity sensor, and can detect approach of some object to the eyepiece portion 16 of the finder 17 that incorporates the EVF29. When an object approaches, infrared light emitted from a light-emitter (not shown) of the eye-proximity detection unit 57 is reflected off the object and is received by a light-receiver (not shown) of the infrared proximity sensor. It is also possible to determine the distance (eye-proximity distance) from the eyepiece portion 16 to the approaching object based on the amount of infrared light received. The eye-proximity detection unit 57 thus detects eye proximity, i.e. detects the proximity distance from an object to the eyepiece portion 16. When an object approaching the eyepiece portion 16 is detected within a predetermined distance from a non-eye-proximity state (non-approaching state), it is detected that the eye has approached the eyepiece portion 16. When the object whose approach was detected moves away from an eye-proximity state (approaching state) by a predetermined distance or more, it is detected that the eye has departed. A threshold value for detecting eye proximity and a threshold value for detecting eye departure may be made different by providing hysteresis, for example. After detecting eye proximity, it is considered that the eye remains close until eye departure is detected. After detecting eye departure, it is considered that the eye is not close until eye proximity is detected. Note that the infrared proximity sensor is one example, and any other sensor may be employed as the eye-proximity detection unit 57 as long as the sensor can detect a state that can be considered as eye proximity.

The outside-finder display unit 43 displays various set values of the camera, including the shutter speed and f-number, via an outside-finder display unit drive circuit 44.

A power supply control unit 80 is constituted by a battery detection circuit, a DC-DC converter, a switch circuit for switching a block through which a current is to flow, or the like, and detects, for example, whether a battery is mounted, the type of the battery, and the remaining battery charge. The power supply control unit 80 controls the DC-DC converter based on the detection results and instructions from the system control unit 50, and supplies a necessary voltage to parts including the recording medium 200 for a necessary time period. The power supply unit 30 is constituted by a primary battery such as an alkaline or lithium battery, a secondary battery such as an NiCd, NiMH, or Li battery, or an AC adapter.

A recording medium I/F 18 is an interface to the recording medium 200, which is a memory card, a hard disk, or the like. The recording medium 200 is a recording medium, such as a memory card, for recording captured images, and is constituted by a semiconductor memory, a magnetic disk, or the like.

An operation unit 70 is an input unit that accepts operations made by the user (user operations) and is used to input various operating instructions to the system control unit 50. As shown in FIG. 2, the operation unit 70 includes the mode change-over switch 60, the shutter button 61, the power switch 72, the touch-screen panel 70a, and other operation members 70b. The other operation members 70b include the main electronic dial 71, the sub-electronic dial 73, the four-direction key 74, the SET button 75, the moving-image button 76, the AE lock button 77, the enlargement button 78, the reproduction button 79, the menu button 81, the touch bar 82, and so on.

The mode change-over switch 60 switches the operating mode of the system control unit 50 to any of still-image capture modes, moving-image capture modes, a reproduction mode, and other modes. The still-image capture modes include modes such as an auto-photographing mode, an auto-scene determination mode, a manual mode, an aperture priority mode (Av mode), a shutter-speed priority mode (Tv mode), and a program AE mode (P mode). There are also various scene modes, custom modes, and the like, which are photographing settings for different photographing scenes. The mode change-over switch 60 allows the user to directly switch to any of these modes. Alternatively, it is also possible to temporarily switch to a photographing mode list screen using the mode change-over switch 60, and selectively switch to any of a plurality of displayed modes using another operation member. Similarly, the moving-image photographing modes may also include a plurality of modes.

The shutter button 61 includes a first shutter switch 62 and a second shutter switch 64. The first shutter switch 62 is turned on by a so-called half-press (instruction for photographing preparation) during the operation of the shutter button 61, and generates a first shutter-switch signal SW1. The system control unit 50 starts photographing preparation operations, such as AF (autofocus) processing, AE (automatic exposure) processing, AWB (auto-white balance) processing, and EF (pre-flashing) processing, in response to the first shutter-switch signal SW1. The second shutter switch 64 is turned on when the operation of the shutter button 61 is completed, i.e. by a so-called full-press (photographing instruction), and generates a second shutter-switch signal SW2. In response to the second shutter-switch signal SW2, the system control unit 50 starts a series of photographing processing operations from reading a signal from the image capture unit 22 to writing a captured image as an image file to the recording medium 200.

The touch-screen panel 70a is a touch sensor that detects various touch operations on a display surface (an operation surface of the touch-screen panel 70a) of the display unit 28.

The touch-screen panel 70a can be integrated with the display unit 28. For example, the touch-screen panel 70a is configured such that the light transmission thereof does not interfere with display on the display unit 28, and is attached to an upper layer of the display surface of the display unit 28. Further, input coordinates on the touch-screen panel 70a are associated with display coordinates on the display unit 28. This makes it possible to provide a GUI (graphical user interface) that makes the user feel as if the user can directly operate the screen displayed on the display unit 28.

A description is given, with reference to FIGS. 3A to 8B, of angle-of-view assistance processing designed for moving-image editing (i.e. angle-of-view assistance processing that facilitates placement of a capturing-target object in a range appropriate for moving-image editing). In the first embodiment, a situation is envisioned where the user is capturing a moving image during a trip by self-photographing. The user directs the display unit 28 toward the lens unit 150 and is capturing an image while checking themself and the background in the live-view screen displayed on the display unit 28. The user also plans to edit and post the recorded moving image (of the trip) later.

Figure 3A:
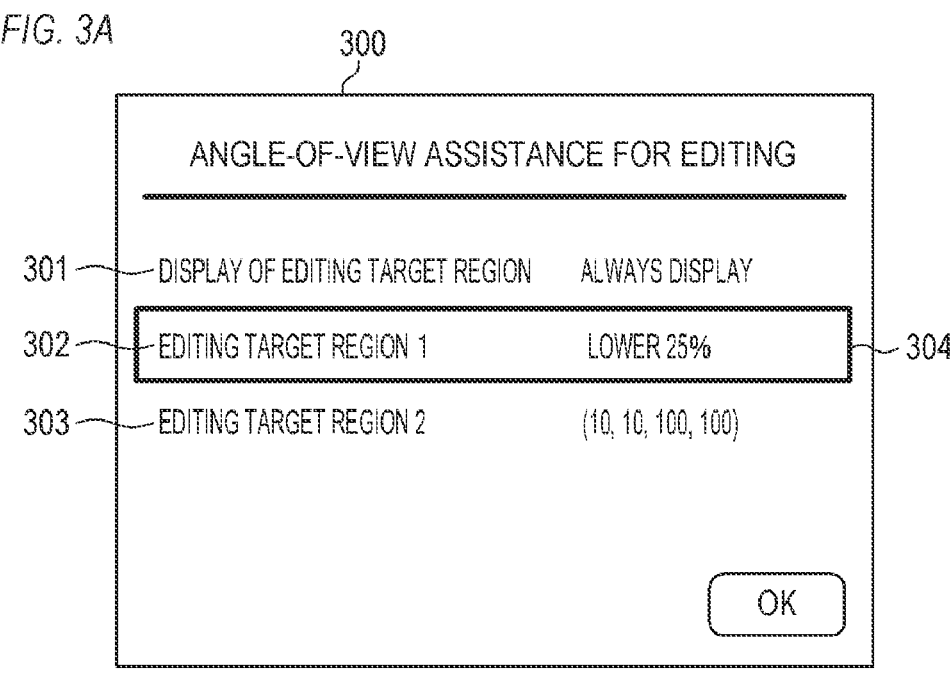
FIG. 3A is a schematic view of a menu screen.
Figure 3B:
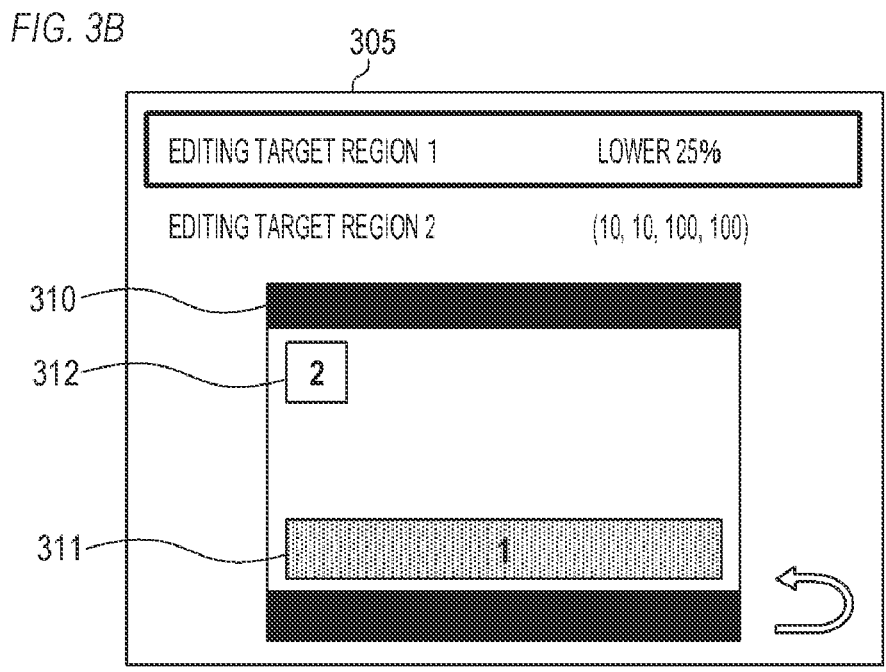
FIG. 3B is a schematic view of a preview screen.

In the first embodiment, the user can specify, in advance, a partial region of the screen (the live-view screen on which the live-view image is displayed) as an editing target region. The editing target region refers to a region that is (can be) subjected to editing, such as combining a telop. The editing target region can be identifiably displayed on the live-view screen. FIGS. 3A and 3B show examples of the user specifying editing target regions.

FIG. 3A shows a menu screen 300 for the user to specify editing target regions. The user can specify an editing target region and give an instruction to change a display setting of an editing target region by using the menu screen 300. The system control unit 50 loads a previous set value or a predetermined initial value stored in the nonvolatile memory 56 to the system memory 52 and displays the menu screen 300 on the display unit 28. Then, the system control unit 50 sets an editing target region and changes display settings of an editing target region in accordance with user operations.

A setting item 301 indicates a current display setting of editing target regions. The user can select and operate the setting item 301 to give an instruction to change the display setting of the editing target regions. For example, there are three display settings for editing target regions, namely "always display," "hide," and "customized display". "Always display" refers to a display setting for always identifiably displaying each editing target region in the live-view screen. "Hide" refers to a display setting for not identifiably displaying each editing target region in the live-view screen. "Customized display" refers to, for example, a display setting for identifiably displaying each editing target region in the live-view screen only when a predetermined condition is satisfied. The system control unit 50 records set values that indicate the display settings selected by the user in the system memory 52 and the nonvolatile memory 56. In the first embodiment, "always display" is selected.

Setting items 302 and 303 indicate current editing target regions. The user can select and operate the setting items 302 and 303 to specify editing target regions. For example, the user can specify an editing target region by a percentage from one side of the live-view screen or the live-view image. In the setting item 302, a region that is 25% from the lower side of the live-view image (one-fourth of the live-view image) is specified as a first editing target region by "Lower 25%". The user can specify an editing target region by a combination of the position in the lateral (horizontal, left-right) direction, the position in the vertical (up-down) direction, the width, and the height. In the setting item 303, a second editing target region is specified by "10, 10, 100, 100 (position in the lateral direction, position in the vertical direction, width, height)".

A cursor 304 is a cursor for the user to operate the menu screen 300, and is used, for example, to select any of the setting items 301 to 303.

When the user specifies an editing target region, a preview screen of the editing target region is displayed. For example, when the user selects the setting item 302 with the cursor 304 and presses the SET button 75, a preview screen 305 shown in FIG. 3B is displayed, and the editing target region corresponding to the setting item 302 can be changed. A live-view screen 310 is displayed on the preview screen 305, and editing target regions 311 and 312 are identifiably displayed on the live-view screen 310. The editing target region 311 corresponds to the setting item 302, and the editing target region 312 corresponds to the setting item 303. The editing target regions 311 and 312 are displayed in different display modes such that the user can understand that the editing target region 311 can be changed. The user can easily understand the editing target regions and easily specify a desired editing target region by checking the preview screen (the live-view screen displayed on the preview screen). The system control unit 50 records the set values indicating the editing target regions specified by the user in the system memory 52 and the nonvolatile memory 56.

Although an example where two editing target regions are specified (set) has been described, the number of editing target regions is not specifically limited. One editing target region may be specified (set), or three or more editing target regions may be specified (set). In the preview screen, a screen of any still image or moving image may be displayed, instead of the live-view screen, as a screen for checking editing target regions.

The method for specifying editing target regions is not limited to the above method. For example, the user may draw a figure by performing a touch operation and thereby specify the region of this figure as an editing target region. The user may select an editing target region from a plurality of candidate editing target regions. The user may select one of a plurality of templates each including at least one editing target region. For example, the user may switch the template to be used between a template for a trip moving image and a template for a product review, for each photographing scene.

Figure 4:
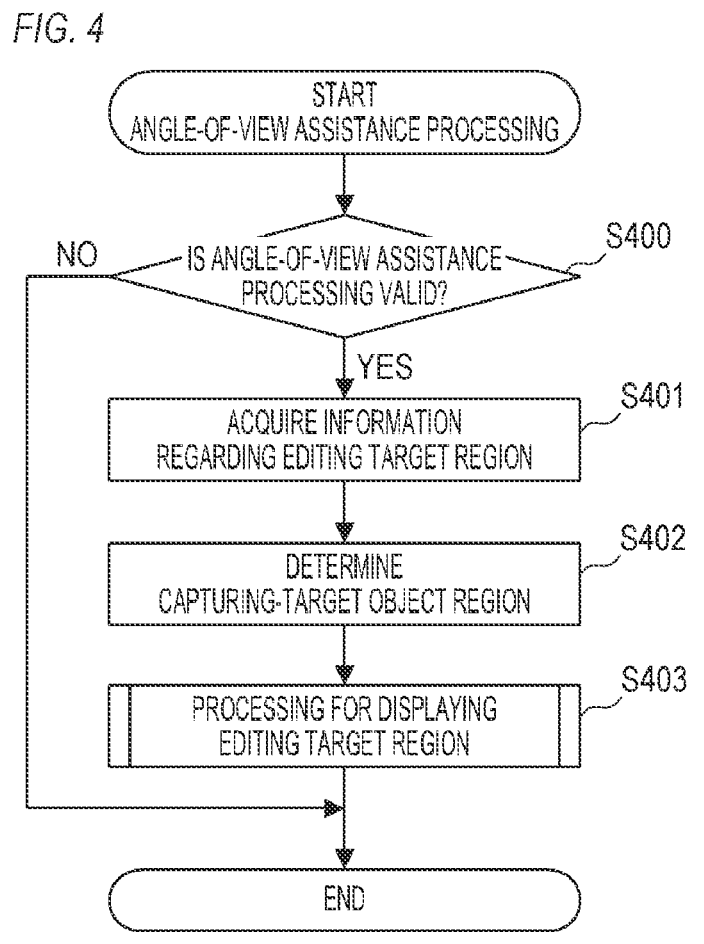

FIG. 4 is a flowchart of the angle-of-view assistance processing in the first embodiment. This processing is realized by the system control unit 50 loading a program stored in the nonvolatile memory 56 to the system memory 52 and executing the loaded program. The angle-of-view assistance processing in FIG. 4 is repeated while capturing a moving image in a predetermined cycle (e.g. angle-of-view assistance processing image-capture cycle of the live-view image in the image capture unit 22 or a screen update cycle in the display unit 28). Note that the system control unit 50 may also execute various types of processing in parallel with the angle-of-view assistance processing in FIG. 4. For example, if an instruction to change the zoom ratio is given from the user while the angle-of-view assistance processing in FIG. 4 is executed, the system control unit 50 may change the zoom ratio in accordance with the instruction.

In S400, the system control unit 50 determines whether or not the angle-of-view assistance processing is valid. For example, the system control unit 50 reads a set value indicating display settings for an editing target region from the system memory 52, and uses the set value to determine whether or not the angle-of-view assistance processing is valid. If the display setting indicated by the set value is "hide," the system control unit 50 determines that the angle-of-view assistance processing is invalid and ends the angle-of-view assistance processing in FIG. 4. If the display setting is not "hide" (i.e. is "always display" or "customized display"), the system control unit 50 determines that the angle-of-view assistance processing is valid, and the processing proceeds to S401.

In S401, the system control unit 50 acquires information regarding the editing target region. For example, the system control unit 50 reads the set value indicating the editing target region from the system memory 52.

In S402, the system control unit 50 acquires a live-view image and determines a capturing-target object region based on the live-view image. For example, the system control unit 50 reads a live-view image from the memory 32, performs face detection processing using the live-view image, and determines, as a capturing-target object region, a region detected as a face region. Note that the system control unit 50 may perform human-body detection processing and determine, as a capturing-target object region, a region detected as a human body. The system control unit 50 may also perform object detection processing and determine, as a capturing-target object region, a region detected as an object (e.g. vehicle or animal) region.

In S403, the system control unit 50 performs processing for displaying the editing target region. In this processing, the system control unit 50 displays the live-view image (live-view screen) such that the editing target region is identifiable, based on whether or not a predetermined condition regarding overlap between the editing target region and the capturing-target object region is satisfied. The live-view image (live-view screen) is displayed on the display unit 28. Note that the method for identifiably displaying the editing target region is not specifically limited. For example, the editing target region may be identifiably displayed by combining an item (graphic) representing the editing target region with the live-view image (live-view screen). The editing target region may be identifiably displayed by changing pixel values of the live-view image (live-view screen).

Figure 5:
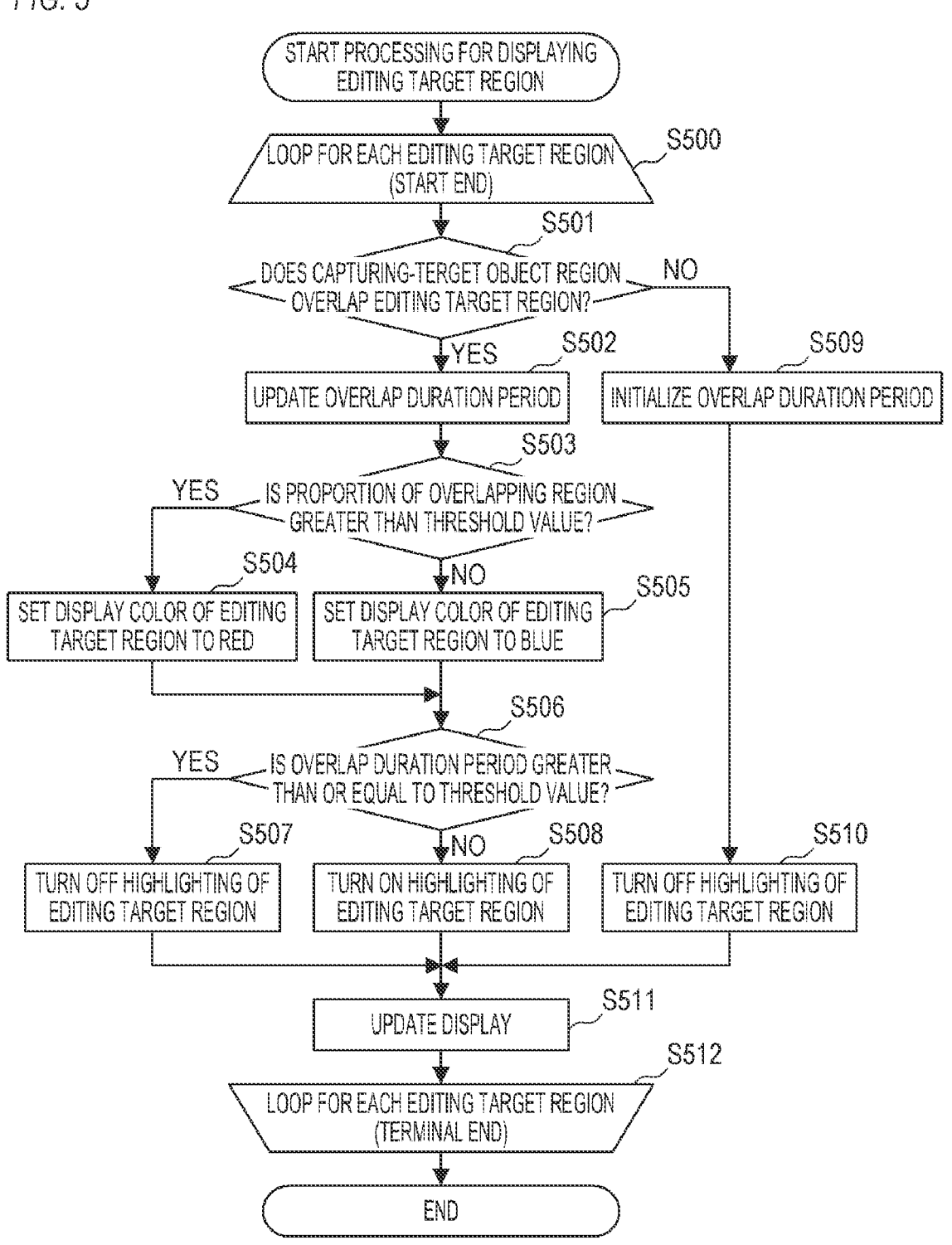
FIG. 5 is a flowchart of processing for displaying an edit target region according to a first embodiment.

FIG. 5 is a flow chart of processing for displaying the editing target region (S403 in FIG. 4). The display processing shown in FIG. 5 is processing performed when the display setting of the editing target region is "always display".

S500 indicates a start end of loop processing, and S512 indicates a terminal end of the loop processing. The system control unit 50 performs processing from S501 to S511 for each editing target region (editing target region determined based on information acquired in S401 in FIG. 4). Thus, when a plurality of editing target regions are set, display of the editing target regions in the live-view image (live-view screen) is separately controlled.

Figure 6A:
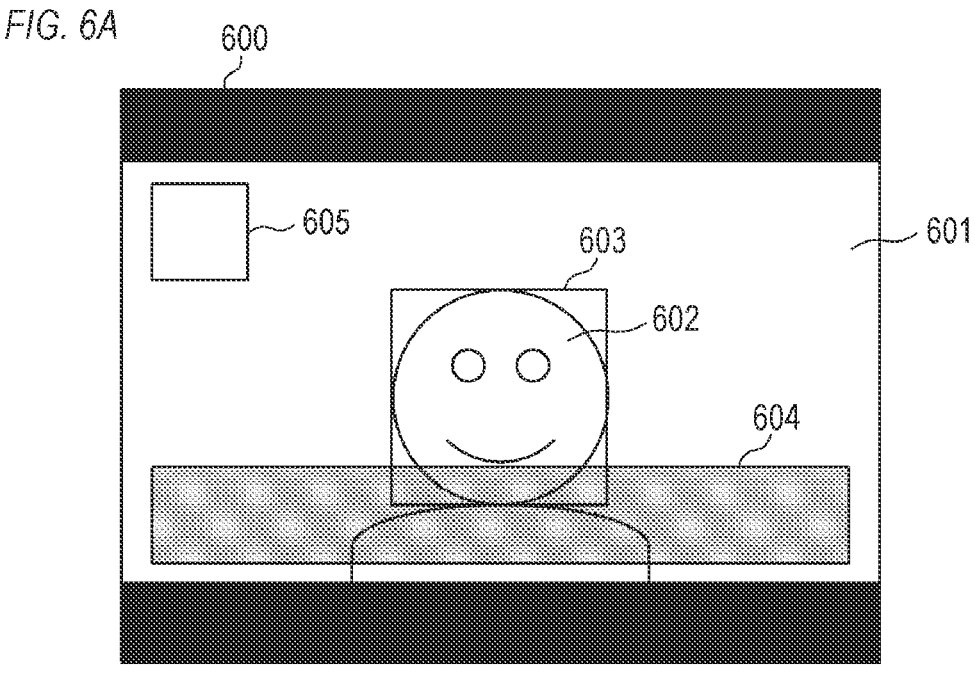
FIGS. 6A and 6B are schematic views of a live-view screen.

FIG. 6A shows a live-view screen 600. A live-view image 601 is displayed on the live-view screen 600 in FIG. 6A and includes a capturing-target object region 603, which is a region of the user's face 602, and editing target regions 604 and 605. In FIG. 6A, the user's face 602 is placed at a lower position in the live-view image 601 due to the angle at which the user holds the digital camera 100 having been shifted.

First, a description is given of processing for the editing target region 604 performed to display the live-view screen 600 in FIG. 6A.

In S501, the system control unit 50 determines whether or not the editing target region to be processed (one editing target region determined based on the information acquired in S401 in FIG. 4) overlaps the capturing-target object region determined in S402. The processing proceeds to S502 if the regions overlap, and proceed to S509 if not. For example, the system control unit 50 compares the coordinates of the capturing-target object region 603 with the coordinates of the editing target region 604 in FIG. 6A, and determines whether or not these regions overlap. Since the capturing-target object region 603 overlaps the editing target region 604 in FIG. 6A, the processing proceeds to S502.

S509 and S510 will be described later.

In S502, the system control unit 50 updates the value of a time period during which the capturing-target object region overlaps the editing target region to be processed (overlap duration period). For example, the initial value of the overlap duration period is 0, and the value of the overlap duration period is stored in the system memory 52. The overlap duration period is managed for each editing target region. The system control unit 50 adds a value corresponding to (equivalent to) the time of an execution cycle of the angle-of-view assistance processing in FIG. 4 to the value of the overlap duration period (a value stored in the system memory 52) corresponding to the editing target region to be processed.

In S503, the system control unit 50 determines whether or not the proportion of the overlapping region (the region where the capturing-target object region overlaps the editing target region to be processed) to the capturing-target object region is greater than a threshold value (e.g. 20%). The processing proceeds to S504 if the proportion of the over-lapping region to the capturing-target object region is greater than the threshold value, and the processing proceeds to S505 if not. If the proportion of the overlapping region to the capturing-target object region is equal to the threshold value, the processing may proceed to S504. For example, the system control unit 50 calculates the size of the capturing-target object region 603 from the coordinates of the capturing-target object region 603 in FIG. 6A, and calculates the size (e.g. the number of pixels) of the overlapping region where the capturing-target object region 603 overlaps the editing target region 604, from the coordinates of these regions. The system control unit 50 then calculates the proportion of the overlapping region to the size of the capturing-target object region 603, and compares the calculated proportion to a threshold value. It is assumed in FIG. 6A that the proportion of the size of the overlapping region to the size of the capturing-target object region 603 is greater than the threshold value. Therefore, the processing proceeds to S504.

In S504 or S505, the system control unit 50 sets the display mode of the editing target region to be processed. In S504, the system control unit 50 sets, to red, the display color of the editing target region to be processed. In S505, the system control unit 50 sets, to blue, the display color of the editing target region to be processed. For example, the system control unit 50 sets, to red, the display color of the editing target region 604 in FIG. 6A.

In the first embodiment, either processing in S504 or S505 is selectively performed in accordance with the result of the determination in S503. Thus, the display mode of the editing target region in the live-view image (live-view screen) is changed in response to the condition in S503 (that the proportion of the overlapping region to the capturing-target object region is greater than the threshold value) being satisfied. For example, the saliency of the editing target region in the live-view image increases in response to the condition in S503 being satisfied. As a result, the user can be promoted to adjust the angle of view (photographing range) such that the capturing-target object is placed in a range appropriate for editing (i.e. a range that does not overlap the editing target region). The saliency can be understood as the degree of saliency or visibility. Note that the change in the display mode is not limited to a change in the display color, and may alternatively be, for example, a change in the transparency or a change in the flashing pattern (e.g. flashing frequency).

In S506, the system control unit 50 determines whether or not the overlap duration period corresponding to the editing target region to be processed is greater than or equal to a predetermined time period (e.g. 3 seconds). The processing proceeds to S507 if the overlap duration period is greater than or equal to the predetermined time period, and proceeds to S508 if not. It is assumed in FIG. 6A that the overlap duration period corresponding to the editing target region 604 is shorter than the predetermined time period. Therefore, the processing proceeds to S508. Note that the afore-mentioned predetermined time period to be compared with the overlap duration period may be a fixed time period that cannot be changed by the user, or may be a time period that can be changed by the user. For example, a setting item for the user to specify a time period may be added to the menu screen 300 of FIG. 3A. The time period specified by the user may be used as the aforementioned predetermined time period to be compared with the overlap duration period.

S507 will be described later.

In S508, the system control unit 50 turns on highlighting of the editing target region to be processed. In the first embodiment, the highlighting can be turned on and off for each editing target region. The system control unit 50 turns on the highlighting of the editing target region 604 in FIG. 6A. If the display setting of the editing target region is "always display", the system control unit 50 always displays the live-view image (live-view screen) such that the editing target region is identifiable. Then, when the condition in S501 (the editing target region overlaps the capturing-target object region) is satisfied, the system control unit 50 per-forms the processing in S508. Thus, the live-view image (live-view screen) is displayed with the editing target region highlighted in response to the condition in S501 being satisfied. As a result, the user can be promoted to adjust the angle of view (photographing range) such that the capturing-target object is placed in a range appropriate for editing (i.e. a range that does not overlap the editing target region).

In S511, the system control unit 50 updates display of the live-view screen (e.g. display of the editing target region). For example, as for the editing target region 604 in FIG. 6A, the display color has been set to red in S504, and the highlighting has been turned on in S508. Here, it is assumed that the highlighting is superimposed display of a translucent item filled in a set display color. Thus, the system control unit 50 displays a translucent item filled in red in a super-imposing manner on the editing target region 604 in FIG. 6A. Further, the system control unit 50 displays a red frame surrounding the editing target region 604 in FIG. 6A.

Next, a description is given of processing for the editing target region 605 performed to display the live-view screen 600 in FIG. 6A.

Since the capturing-target object region 603 does not overlap the editing target region 605 in FIG. 6A, the processing proceeds from S501 to S509.

In S509, the system control unit 50 initializes the value of the overlap duration period corresponding to the editing target region to be processed to 0. For example, the system control unit 50 initializes the value of the overlap duration period corresponding to the editing target region 605 to 0.

In S510, the system control unit 50 turns off the high-lighting of the editing target region to be processed. For example, the system control unit 50 turns off the highlight-ing of the editing target region 605 in FIG. 6A.

In S511, the system control unit 50 updates display of the live-view screen (e.g. display of the editing target region). For example, for the editing target region 605 in FIG. 6A, the highlighting is turned off in S510. Therefore, the system control unit 50 does not highlight the editing target region 605 in FIG. 6A, and displays a blue frame surrounding the editing target region 605 in FIG. 6A.

Figure 6B:
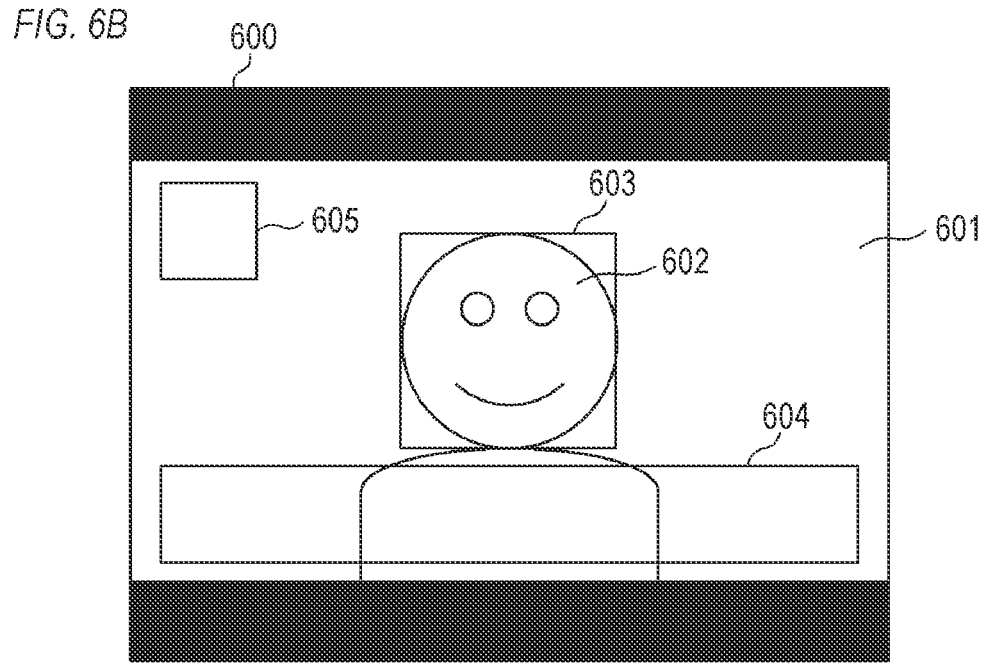

In FIG. 6A, the translucent item filled in red is displayed in a superimposed manner (highlighting) on the editing target region 604, which greatly overlaps the capturing-target object region 603. As for the editing target region 605, which does not overlap the capturing-target object region 603, only the blue frame (outline) is displayed therearound. By viewing the live-view screen 600 in FIG. 6A while capturing a moving image, the user can understand that his or her own face 602 greatly overlaps the editing target region 604, and can adjust the angle of view (photographing range) such that the face 602 is placed in a range appropriate for editing. FIG. 6B shows the live-view screen 600 after the angle of view has been adjusted. In FIG. 6B, the capturing-target object region 603 does not overlap the editing target region 604 or the editing target region 605. Therefore, the highlighting of the editing target region 604 is canceled, and only the blue frames (outlines) are displayed around both the editing target regions 604 and 605. Thus, the user places the capturing-target object in a range appropriate for editing.

Note that an example has been described where each editing target region is always displayed identifiably, and the editing target region is highlighted in response to the con-dition in S501 (the editing target region overlaps the cap-turing-target object region) being satisfied. However, this need not be the case. For example, a configuration may alternatively be employed where, if the display setting is "customized display", each editing target region is not identifiably displayed (i.e. each editing target region is hidden) until the condition in S501 is satisfied, and is identifiably displayed in response to the condition in S501 being satisfied. That is, a configuration may be employed where the editing target region is displayed if the highlight-ing is on, but if the highlighting is off, whether or not to display the editing target region is switched in accordance with the display setting indicated by the setting item 301 (the editing target region is displayed if the display setting is "always display", and the editing target region is hidden if the display setting is "customized display"). Further, in the case where the display setting is "customized display", the highlighting can be realized without changing the frame color by hiding the editing target region when the highlight-ing is off, and displaying the editing target region when the highlighting is on.

Figure 7A:
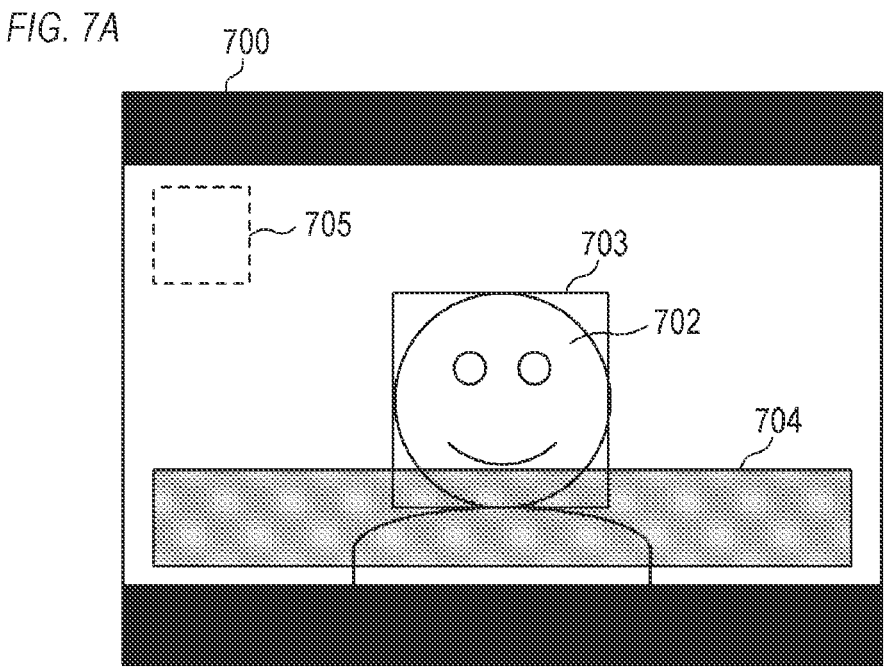
FIGS. 7A and 7B are schematic views of a live-view screen.
Figure 7B:
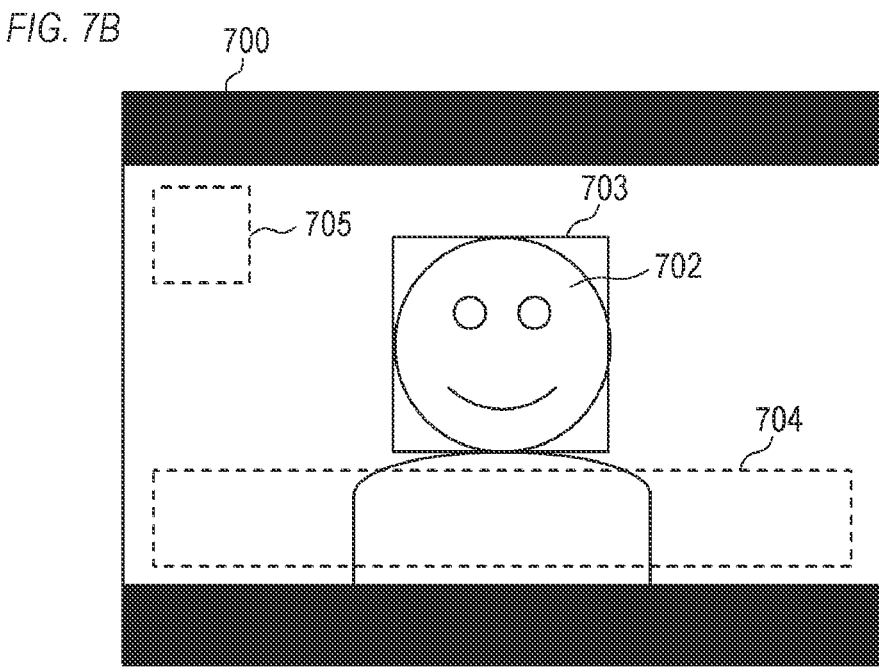

FIG. 7A shows a live-view screen 700 in the case of switching whether or not to identifiably display each editing target region in accordance with whether not the condition in S501 is satisfied. In the live-view screen 700 in FIG. 7A, a capturing-target object region 703 greatly overlaps an editing target region 704, and therefore, a translucent item filled in red is displayed in a superimposed manner on the editing target region 704, as for the editing target region 604 in FIG. 6A. Since the capturing-target object region 703 does not overlap an editing target region 705, the editing target region 705 is not identifiably displayed. Although a broken line indicating the editing target region 705 is drawn in FIG. 7A, this broken line is drawn merely to indicate the editing target region 705 and is not actually displayed in the live-view screen 700. By viewing the live-view screen 700 in FIG. 7A while capturing a moving image, the user can understand that his or her own face 702 greatly overlaps the editing target region 704, and can adjust the angle of view (photographing range) such that the face 702 is placed in a range appropriate for editing. FIG. 7A shows a live-view screen 700 after subjected to the angle-of-view adjustment. In FIG. 7B, the capturing-target object region 703 does not overlap either the editing target region 704 or 705, and therefore, neither of the editing target regions 704 and 705 is displayed identifiably.

By thus identifiably displaying an editing target region only when adjustment of the angle of view (photographing range) is necessary, it is possible to realize both the ease of viewing the live-view image (live-view screen) and assis-tance in the adjustment of the angle of view.

The condition in S501 is not limited to that an editing target region overlaps a capturing-target object region. For example, the condition in S501 may alternatively be that the proportion of the overlapping region (the region where the editing target region overlaps the capturing-target object region) to the capturing-target object region is greater than a threshold value (e.g. 5%). The condition in S501 may alternatively be that the time period during which the editing target region overlaps the capturing-target object region (overlap duration period) is longer than a threshold value (e.g. 1 second). The condition may also be that the time average of the proportion of the overlapping region to the capturing-target object region (e.g. the time average in the time period from the present to 1 second ago) is greater than a threshold value (e.g. 5%).

Consideration is given to a case where an overlapping state and a non-overlapping state between an editing target region and a capturing-target object region are repeated. In this case, if the condition that the editing target region overlaps the capturing-target object region is used as the condition in S501, the highlighting (or identifiable display) of the editing target region repeatedly turns on and off, resulting in flickering of the editing target region. If the condition in S501 is changed as mentioned above, the highlighting (or identifiable display) of the editing target region is not turned on, and thus, flickering of the editing target region can be suppressed.

Similar to the condition in S501, the conditions in S503 and S506 can also be changed as appropriate. In S503 to S505, the display mode (display color) of the editing target region is switched between two display modes (red and blue), but the display mode of the editing target region may alternatively be switched between three or more display modes. For example, the correspondence relationship between the proportion of the overlapping region (the region where the editing target region overlaps the capturing-target object region) to the capturing-target object region and the display mode (e.g. transparency, color, or flashing pattern) of an item representing the editing target region may be deter-mined in advance. Then, the item representing the editing target region may be displayed in a superimposed manner on the live-view image (editing target region) in a display mode corresponding to the proportion of the overlapping region to the capturing-target object region. The correspondence rela-tionship between the time period during which the editing target region overlaps the capturing-target object region (overlap duration period) and the display mode of an item representing the editing target region (e.g. transparency, color, or flashing pattern) may be determined in advance. Then, the item representing the editing target region may be displayed in a superimposed manner on the live-view image (editing target region) in a display mode corresponding to the overlap duration period.

There are cases where the user intentionally captures an image such that a capturing-target object appears large. According to the display processing in FIG. 5 (processing for displaying an editing target region), it is possible to realize both the ease of viewing the live-view image (capturing-target object) and the assistance in the angle-of-view adjustment, even when intentionally capturing an image such that the capturing-target object appears large.

The display processing in FIG. 5 performed when displaying a live-view screen 800 in FIG. 8A is described. In FIG. 8A, the image is intentionally captured such that the user's face 802 appears large, and the face 802 is displayed large in the live-view screen 800.

Processing for an editing target region 804 shown in FIG. 8A is described. In FIG. 8A, a capturing-target object region 803 overlaps the editing target region 804, and thus, the processing proceeds from S501 to S502. It is assumed that the proportion of the size of the overlapping region to the size of the capturing-target object region 803 is greater than the threshold value in S503, and the processing proceeds from S503 to S504. It is also assumed that the overlap duration period corresponding to the editing target region 804 (the time period during which the capturing-target object region 803 overlaps the editing target region 804) is shorter than the predetermined time period in S506, and the processing proceeds from S506 to S508. Therefore, for the editing target region 804 in FIG. 8A, the system control unit 50 sets the display color to red in S504 and turns on the highlighting in S508. In S511, the system control unit 50 displays a translucent item filled in red in a superimposing manner on the editing target region 804, as for the editing target region 604 in FIG. 6A.

Processing for an editing target region 805 shown in FIG. 8A is described. Since the capturing-target object region 803 does not overlap the editing target region 805 in FIG. 8A, the processing proceeds from S501 to S509, and the processing in S509 to S512 is performed. Therefore, for the editing target region 805 in FIG. 8A, the system control unit 50 turns off the highlighting in S510. In S511, the system control unit 50 does not highlight the editing target region 805, and displays a blue frame surrounding the editing target region 805, as for the editing target region 605 in FIG. 6A.

When the predetermined time period in S506 has elapsed in the state of FIG. 8A (the state where the capturing-target object region 803 overlaps the editing target region 804), the processing for the editing target region 804 proceeds from S506 to S507.

In S507, the system control unit 50 turns off the highlighting of the editing target region to be processed. For example, the system control unit 50 turns off the highlighting of the editing target region 804. If the predetermined time period has elapsed with the editing target region overlapping the capturing-target object region, there is a high possibility that the capturing-target object region overlaps the editing target region due to the user's intentional angle-of-view adjustment. Therefore, in the first embodiment, the highlighting is turned off to increase the visibility of the live-view image (capturing-target object).

In S511, the system control unit 50 updates display of the live-view screen (e.g. display of the editing target region). For example, for the editing target region 804, the highlighting is turned off in S507, and thus, the system control unit 50 does not highlight the editing target region 804 but displays a red frame surrounding the editing target region 804, as shown in FIG. 8B.

As described above, in the first embodiment, the highlighting of an editing target region is canceled in response to the predetermined time period having elapsed with the editing target region overlapping the capturing-target object region (i.e. the predetermined time period having elapsed since the editing target region was highlighted). This makes it possible to realize both the ease of viewing the live-view image (capturing-target object) and the assistance in the angle-of-view adjustment, even when intentionally capturing an image such that the capturing-target object appears large.

Note that a description has been given of an example where the highlighting of an editing target region is canceled in response to the predetermined time period having elapsed with the editing target region overlapping the capturing-target object region (i.e. the predetermined time period having elapsed since the editing target region was highlighted). However, this need not be the case. For example, the display mode (e.g. transparency, color, or flashing pattern) of the editing target region may alternatively be changed in response to the predetermined time period having elapsed with the editing target region overlapping the capturing-target object region (i.e. the predetermined time period having elapsed since the editing target region was highlighted). At that time, it is preferable to change the display mode so as to reduce the saliency of the editing target region. A configuration may also be employed in which an editing target region is identifiably displayed in response to the editing target region overlapping the capturing-target object region, and the identifiable display of the editing target region is canceled in response to a predetermined time period having elapsed with the editing target region overlapping the capturing-target object region.

Further, although an example of performing the angle-of-view assistance processing while capturing a moving image has been described, the angle-of-view assistance processing may be performed not only while capturing a moving image but also in a photographing standby state. Although an example of capturing a moving image has been described, the photographing is not limited to capturing a moving image, and may also be capturing a still image.

As described above, according to the first embodiment, the live-view image is displayed such that an editing target region is identifiable, based on whether or not a condition regarding overlap between the editing target region and the capturing-target object region is satisfied. This enables the capturing-target object to be easily placed in a range appropriate for editing.

Second Embodiment

The second embodiment of the present disclosure is described. Note that, in the following description, the same features as those of the first embodiment (e.g. the same configurations and processing as those in the first embodiment) are omitted, and only features different from those of the first embodiment are described.

In the second embodiment, a situation is envisioned where the user photographs a capturing-target object that is not the user themself (e.g. food). It is assumed in the second embodiment that the display setting of an editing target region is "customized display". The user can optionally set and change (customize) the condition used when the display setting of the editing target region is "customized display", by using a menu sub-screen (not shown). Further, the user can optionally set and change (customize) the operation performed when the condition for "customized display" is satisfied and the operations performed when this condition is not satisfied. It is assumed in the second embodiment that the user wants assistance in adjusting the angle of view only when the angle of view (photographing range) is shifted for a slightly long time. The user sets a condition that "the overlap duration period is greater than or equal to 1 second", sets a "default action" as an action performed when the condition is satisfied, and sets "hide" as an action performed when the condition is not satisfied.

The angle-of-view assistance processing in the second embodiment is generally the same as that in the first embodiment (FIG. 4). However, it is assumed that in S402, the system control unit 50 detects an in-focus region in the live-view image and determines the in-focus region as a capturing-target object region. For example, the system control unit 50 acquires defocus-amount information from the image capture unit 22. The defocus-amount information contains out-of-focus amount in each region in the live-view image. Based on the defocus-amount information, the system control unit 50 determines, as an in-focus region, a circumscribed rectangular region of a group of regions in the live-view image where the out-of-focus amount is smaller than a reference value, and determines this in-focus region as a capturing-target object region. The angle-of-view assistance processing can be performed in various situations with different capturing-target objects by determining an in-focus region (a region in focus) as a capturing-target object region.

Figure 9:
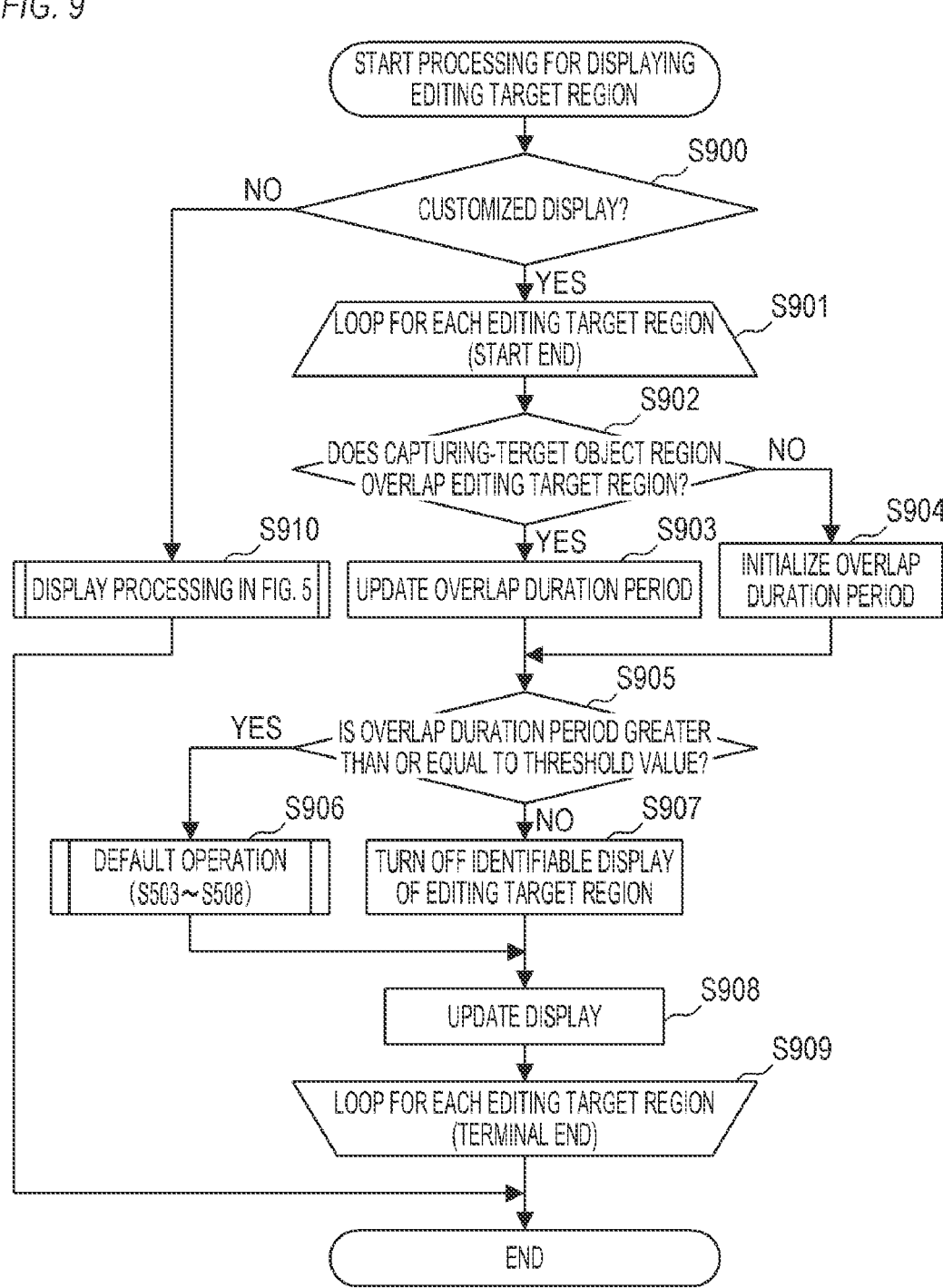
FIG. 9 is a flowchart of processing for displaying the edit target region according to a second embodiment.

FIG. 9 is a flowchart of processing for displaying an editing target region (S403 in FIG. 4) according to the second embodiment.

In S900, the system control unit 50 determines whether or not the display setting of the editing target region is "customized display". The processing proceeds to S901 if the display setting is "customized display", and proceeds to S910 if the display setting is not "customized display" (but is "always display"). In S910, the system control unit 50 performs the display processing (processing for displaying an editing target region) in FIG. 5. It is assumed in the second embodiment that the display setting of the editing target region is "customized display" and the processing proceeds to S901.

S901 is a start end of loop processing, and S909 is a terminal end of the loop processing. The system control unit 50 performs processing in S902 to S908 for each editing target region (each editing target region determined based on the information acquired in S401 in FIG. 4).

Figure 10A:
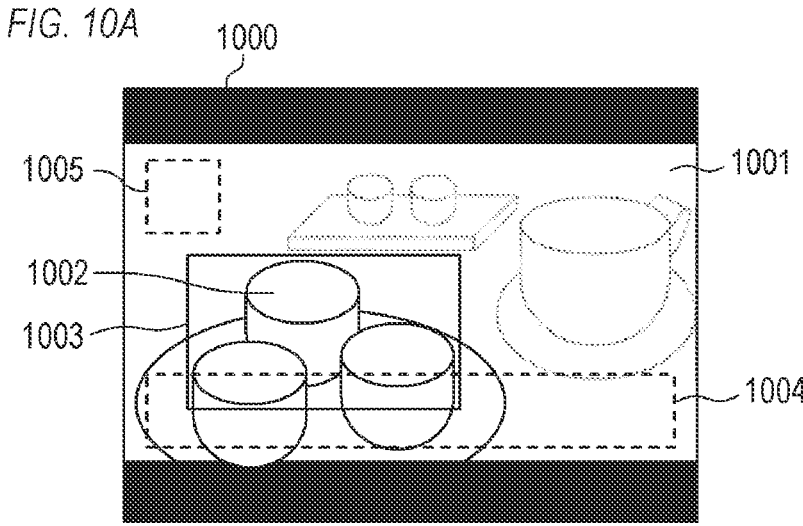
FIGS. 10A to 10C are schematic views of the live-view screen.

FIG. 10A shows a live-view screen 1000. A live-view image 1001 is displayed on the live-view screen 1000 in FIG. 10A. The live-view image 1001 is an image of a dining table, with cakes 1002 placed on the most proximal side, a cup on the distal side of the cakes, and sugar pots placed on the most distal side. The cakes 1002 are in focus, and a region 1003 of the cakes 1002 is set as a capturing-target object region. Editing target regions 1004 and 1005 are also set.

First, a description is given of processing for the editing target region 1004 that is performed to display the live-view screen 1000 in FIG. 10A.

In S902, similar to S501 in FIG. 5, the system control unit 50 determines whether or not the editing target region to be processed (one editing target region determined based on the information acquired in S401 in FIG. 4) overlaps the capturing-target object region determined in S402. The processing proceeds to S903 if those regions overlap, and proceeds to S904 if not. Since the capturing-target object region 1003 overlaps the editing target region 1004 in FIG. 10A, the processing proceeds to S903.

In S903, similar to S502, the system control unit 50 updates the value of the time period during which the capturing-target object region overlaps the editing target region to be processed (overlap duration period).

S904 will be described later.

In S905, the system control unit 50 determines whether or not the overlap duration period corresponding to the editing target region to be processed is greater than or equal to a predetermined time period T1 (e.g. 1 second). The processing proceeds to S906 if the overlap duration period is greater than or equal to the predetermined time period T1, and proceeds to S907 if not. It is assumed in FIG. 10A that the overlap duration period corresponding to the editing target region 1004 is shorter than the predetermined time period T1. Therefore, the processing proceeds to S907.

S906 will be described later.

In S907, the system control unit 50 turns off the identifiable display of the editing target region to be processed. In the second embodiment, the identifiable display can be turned on and off for each editing target region. The system control unit 50 turns off the identifiable display of the editing target region 1004 in FIG. 10A.

In S908, the system control unit 50 updates display of the live-view screen (e.g. display of the editing target region). For example, for the editing target region 1004 in FIG. 10A, the identifiable display is turned off in S907. Therefore, the system control unit 50 does not identifiably display the editing target region 1004 in FIG. 10A.

Next, a description is given of processing for the editing target region 1005 performed to display the live-view screen 1000 in FIG. 10A. In FIG. 10A, the capturing-target object region 1003 does not overlap the editing target region 1005, and thus, the processing proceeds from S902 to S904. In S904, similar to S509, the system control unit 50 initializes the value of the overlap duration period corresponding to the editing target region to be processed to 0. For example, the system control unit 50 initializes the value of the overlap duration period corresponding to the editing target region 1005 to 0. Then, since the value of the overlap duration period corresponding to the editing target region 1005 is initialized to 0, the processing proceeds from S905 to S907, and the processing in S907 and S908 is performed. Therefore, for the editing target region 1005 in FIG. 10A, the system control unit 50 turns off the identifiable display in S907. Then, in S908, the system control unit 50 does not identifiably display the editing target region 1005, as for the editing target region 1004 in FIG. 10A.

In FIG. 10A, the capturing-target object region 1003 overlaps the editing target region 1004. Therefore, if the display processing in FIG. 5 (processing for displaying an editing target region) is performed, the editing target region 1004 in FIG. 10A is highlighted. In the second embodiment, the display setting of each editing target region is "customized display", and thus, the processing in S902 to S908 is performed for the editing target region 1004 in FIG. 10A. As a result, the editing target region 1004 is not identifiably displayed. In FIG. 10A, the editing target region 1005 is not identifiably displayed either.

Figure 10B:
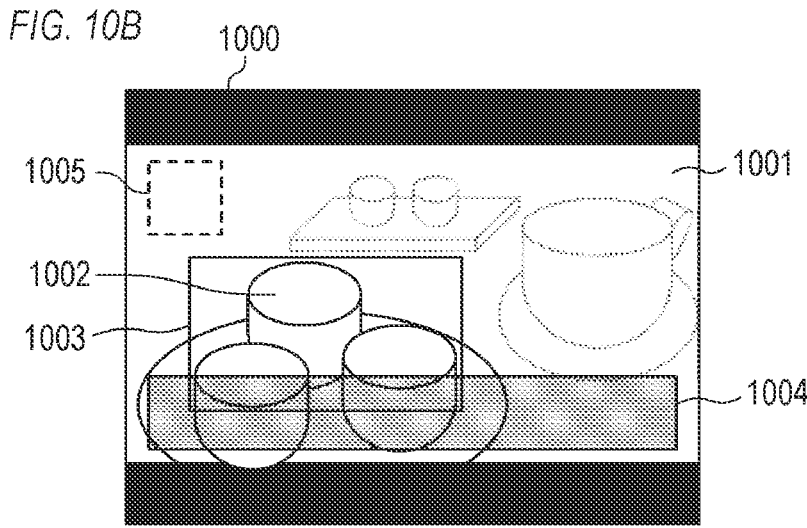

If the predetermined time period T1 in S905 has elapsed in the state shown in FIG. 10A (the state where the capturing-target object region 1003 overlaps the editing target region 1004), the processing for the editing target region 1004 proceeds from S905 to S906. In S906, the system control unit 50 performs a default operation. In the default operation, the processing in S503 to S508 in FIG. 5 is performed. Here, it is assumed that the proportion of the overlapping region (the region where the capturing-target object region 1003 overlaps the editing target region 1004) to the capturing-target object region 1003 is greater than the threshold value (e.g. 20%) in S503, and the processing proceeds from S503 to S504. Further, it is assumed that the overlap duration period corresponding to the editing target region 1004 (the time period during which the capturing-target object region 1003 overlaps the editing target region 1004) is shorter than the predetermined time period T2 (e.g. 3 seconds) in S506, and the processing proceeds from S506 to S508. Therefore, for the editing target region 1004, the system control unit 50 sets the display color to red in S504 and turns on the highlighting in S508. Then, in S908, the system control unit 50 displays a translucent item filled in red in a superimposing manner on the editing target region 1004, as shown in FIG. 10B. Since the capturing-target object region 1003 does not overlap the editing target region 1005, the system control unit 50 does not identifiably display the editing target region 1005.

Figure 10C:
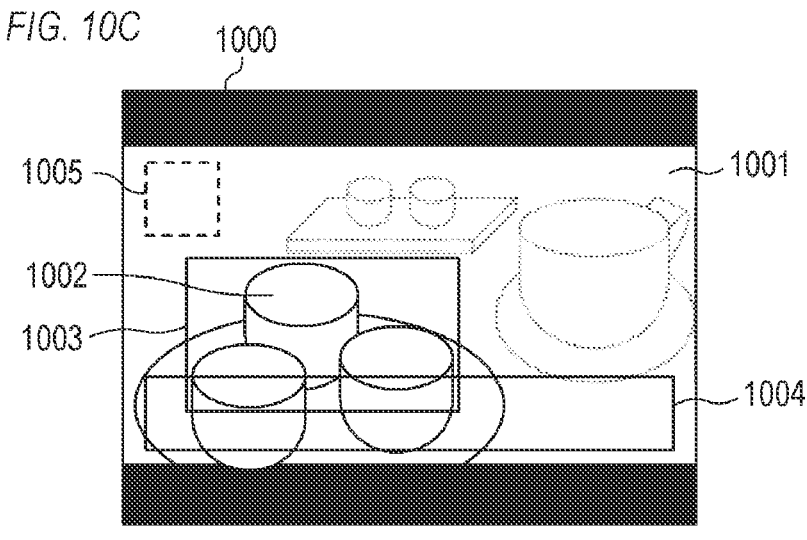

If the predetermined time period T2 in S506 has elapsed in the state shown in FIG. 10B (the state where the capturing-target object region 1003 overlaps the editing target region 1004), the processing proceeds from S506 to S507 in the default operation (S906) for the editing target region 1004. Here as well, it is assumed that the proportion of the overlapping region (the region where the capturing-target object region 1003 overlaps the editing target region 1004) to the capturing-target object region 1003 is greater than the threshold value in S503, and the processing proceeds from S503 to S504. Therefore, for the editing target region 1004, the system control unit 50 sets the display color to red in S504 and turns off the highlighting in S507. Then, in S908, the system control unit 50 does not highlight the editing target region 1004, but displays a red frame surrounding the editing target region 1004, as shown in FIG. 10C. Since the capturing-target object region 1003 does not overlap the editing target region 1005, the system control unit 50 does not identifiably display the editing target region 1005.

As described above, according to the second embodiment, the angle-of-view assistance processing can be used in various situations with different capturing-target objects by determining an in-focus region (a region in focus) as a capturing-target object region. Furthermore, since the conditions and operations for the angle-of-view assistance processing (processing for displaying an editing target region) can be customized, the assistance in the angle-of-view adjustment can be achieved with conditions and operations desired by the user.

In the second embodiment, an editing target region is not identifiably displayed if the time period during which the capturing-target object region overlaps the editing target region overlap to be processed (the overlap duration period) is short, and the editing target region is identifiably displayed if the overlap duration period is long. This makes it possible to suppress flickering in the editing target region when an overlapping state and a non-overlapping state between the capturing-target object region and the editing target region are repeated.

Note that when the display setting of each editing target region is "hide", the operation described in the second embodiment (the operation to identifiably display the editing target region depending on whether or not a predetermined condition is satisfied) may be performed. A configuration may be employed in which the editing target region is identifiably displayed if the overlap duration period is short, and the editing target region is not identifiably displayed if the overlap duration period is long. According to this, even when an image is intentionally captured such that a capturing-target object appears large, it is possible to realize both the ease of viewing the live-view image (capturing-target object) and the assistance in the angle-of-view adjustment.

Note that the various controls described above as being performed by the system control unit 50 may be performed by a single piece of hardware, or more than one piece of hardware (e.g. a plurality of processors or circuits) may share the processing to control the entire device.

Although the embodiments of the present disclosure have been described in detail, the present disclosure is not limited to these specific embodiments, and various modes within the scope that do not deviate from the gist of the disclosure are also included in the disclosure. Further, each of the above-described embodiments merely illustrates one embodiment of the present disclosure, and the embodiments can also be combined as appropriate.

In the above embodiment, the present disclosure is applied to an image capture device (digital camera), but this is not limited to this example, and the disclosure is also applicable to any electronic device that can be controlled so as to display a live-view image. For example, the present disclosure is applicable to a personal computer, a PDA, a mobile phone terminal, a portable image viewer, a printer, a digital photo frame, a music player, a game console, an electronic book reader, or the like. Further, the present disclosure is applicable to a video player, a display device (including a projection device), a tablet terminal, a smartphone, an AI speaker, a home appliance, an in-vehicle device, or the like.

According to the present disclosure, a capturing-target object can be easily placed in a range appropriate for editing.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-015449, filed on Feb. 3, 2023, which is hereby incorporated by reference herein in its entirety.

What is claimed is:

1. An electronic device comprising at least one memory and at least one processor which function as:

an acquisition unit configured to acquire a live-view image;

a setting unit configured to set an editing target region in accordance with a user operation;

a determination unit configured to determine a capturing-target object region on a basis of the live-view image; and a display control unit configured to perform control so as to display the live-view image, wherein the display control unit performs control so as to change a display mode of the editing target region in the live-view image such that the editing target region becomes identifiable or non-identifiable dynamically depending on whether or not a first condition regarding overlap between the editing target region and the capturing-target object region is satisfied.

2. The electronic device according to claim 1, wherein the display control unit performs control so as to display the live-view image such that the editing target region is identifiable, and performs control so as to display the live-view image while highlighting the editing target region in response to the first condition being satisfied.

3. The electronic device according to claim 2, wherein the display control unit performs control so as to cancel the highlighting of the editing target region, in response to a predetermined time period elapsing after performing control so as to display the live-view image while highlighting the editing target region.

4. The electronic device according to claim 2, wherein the display control unit performs control so as to change a display mode of the editing target region, in response to a predetermined time period elapsing after performing control so as to display the live-view image while highlighting the editing target region.

5. The electronic device according to claim 1, wherein the display control unit performs control so as to display the live-view image such that the editing target region is identifiable, in response to the first condition being satisfied.

6. The electronic device according to claim 1, wherein in a case where the first condition is not satisfied, the display control unit performs control so as to display the live-view image without displaying the editing target region.

7. The electronic device according to claim 1, wherein the at least one memory and the at least one processor further function as a display setting unit configured to performing a display setting of the editing target region, and wherein in a case where the display setting unit performs a display setting so as not to display the editing target region, the display control unit performs control so as not to identifiably display the editing target region even if the first condition is satisfied.

8. The electronic device according to claim 1, wherein the display control unit performs control so as to change a display mode of the editing target region in the live-view image, in response to a second condition regarding overlap between the editing target region and the capturing-target object region being satisfied.

9. The electronic device according to claim 1, wherein the determination unit detects a face region in the live-view image, and determines the face region as the capturing-target object region.

10. The electronic device according to claim 1, wherein the determination unit detects an in-focus region in the live-view image, and determines the in-focus region as the capturing-target object region.

11. The electronic device according to claim 1, wherein the determination unit detects a human-body region in the live-view image, and determines the human-body region as the capturing-target object region.

12. The electronic device according to claim 1, wherein the determination unit detects an object region in the live-view image, and determines the object region as the capturing-target object region.

13. The electronic device according to claim 1, wherein the first condition is a condition that the editing target region overlaps the capturing-target object region.

14. The electronic device according to claim 1, wherein the first condition is a condition that a proportion of a region where the editing target region overlaps the capturing-target object region to the capturing-target object region is greater than a threshold value.

15. The electronic device according to claim 1, wherein the first condition is a condition that a time period during which the editing target region overlaps the capturing-target object region is longer than a threshold value.

16. The electronic device according to claim 1, wherein the first condition is a condition that a time average of a proportion of a region where the editing target region overlaps the capturing-target object region to the capturing-target object region is greater than a threshold value.

17. The electronic device according to claim 1, wherein in a case where a plurality of editing target regions are set, the display control unit separately controls display of each of the plurality of editing target regions in the live-view image.

18. The electronic device according to claim 1, wherein, on a basis of whether or not the first condition is satisfied, the display control unit performs control so as to display an item indicating the editing target region and having a transparency corresponding to a proportion of a region where the editing target region overlaps the capturing-target object region to the capturing-target object region, in a superimposing manner on the live-view image.

19. The electronic device according to claim 1, wherein, on a basis of whether or not the first condition is satisfied, the display control unit performs control so as to display an item indicating the editing target region and having a color corresponding to a proportion of a region where the editing target region overlaps the capturing-target object region to the capturing-target object region, in a superimposing manner on the live-view image.

20. The electronic device according to claim 1, wherein, on a basis of whether or not the first condition is satisfied, the display control unit performs control so as to display an item indicating the editing target region and having a flashing pattern corresponding to a proportion of a region where the editing target region overlaps the capturing-target object region to the capturing-target object region, in a superimposing manner on the live-view image.

21. The electronic device according to claim 1, wherein, on a basis of whether or not the first condition is satisfied, the display control unit performs control so as to display an item indicating the editing target region and having a transparency corresponding to a time period during which the editing target region overlaps the capturing-target object region, in a superimposing manner on the live-view image.

22. The electronic device according to claim 1, wherein, on a basis of whether or not the first condition is satisfied, the display control unit performs control so as to display an item indicating the editing target region and having a color corresponding to a time period during which the editing target region overlaps the capturing-target object region, in a superimposing manner on the live-view image.

23. The electronic device according to claim 1, wherein, on a basis of whether or not the first condition is satisfied, the display control unit performs control so as to display an item indicating the editing target region and having a flashing pattern corresponding to a time period during which the editing target region overlaps the capturing-target object region, in a superimposing manner on the live-view image.

24. The electronic device according to claim 1, wherein, even if a setting is performed so as not to identifiably display the editing target region, the display control unit performs control so as to display the live-view image such that the editing target region is identifiable, on a basis of whether or not the first condition is satisfied.

25. A control method of an electronic device, comprising:
acquiring a live-view image;
setting an editing target region in accordance with a user operation;

determining a capturing-target object region on a basis of the live-view image; and performing control so as to display the live-view image, wherein control is performed so as to change a display mode of the editing target region in the live-view image such that the editing target region becomes identifiable or non-identifiable dynamically depending on whether or not a first condition regarding overlap between the editing target region and the capturing-target object region is satisfied.

26. A non-transitory computer readable medium that stores a program, wherein the program causes a computer to execute a control method of an electronic device, the control method comprising:
acquiring a live-view image;
setting an editing target region in accordance with a user operation;
determining a capturing-target object region on a basis of the live-view image; and
performing control so as to display the live-view image, wherein control is performed so as to change a display mode of the editing target region in the live-view image such that the editing target region becomes identifiable or non-identifiable dynamically depending on whether or not a first condition regarding overlap between the editing target region and the capturing-target object region is satisfied.

* * * * *